US 011321833B2

(12) United States Patent
Kunze et al.

(10) Patent No.: US 11,321,833 B2
(45) Date of Patent: May 3, 2022

(54) SEGMENTING METAL OBJECTS IN PROJECTION IMAGES

(71) Applicant: Siemens Healthcare GmbH, Erlangen (DE)

(72) Inventors: Holger Kunze, Bubenreuth (DE); Peter Fischer, Erlangen (DE); Björn Kreher, Bräuningshof (DE); Tristan Gottschalk, Erlangen (DE); Michael Manhart, Fürth (DE)

(73) Assignee: Siemens Healthcare GmbH, Erlangen (DE)

( * ) Notice: Subject to any disclaimer, the term of this patent is extended or adjusted under 35 U.S.C. 154(b) by 60 days.

(21) Appl. No.: 16/782,359

(22) Filed: Feb. 5, 2020

(65) Prior Publication Data
US 2020/0250820 A1   Aug. 6, 2020

(30) Foreign Application Priority Data
Feb. 5, 2019   (EP) .................................... 19155505

(51) Int. Cl.
*G06T 7/00* (2017.01)
*G06T 7/11* (2017.01)
*G06T 11/00* (2006.01)

(52) U.S. Cl.
CPC .............. *G06T 7/0012* (2013.01); *G06T 7/11* (2017.01); *G06T 11/008* (2013.01);
(Continued)

(58) Field of Classification Search
CPC ....... G06T 7/0012; G06T 7/11; G06T 11/008; G06T 2207/10081; G06T 2207/20081;
(Continued)

(56) References Cited

U.S. PATENT DOCUMENTS

2008/0123806 A1   5/2008   Scholz
2011/0081071 A1*  4/2011   Benson ................. G06T 11/005
                                                       382/154
(Continued)

FOREIGN PATENT DOCUMENTS

DE   1 02006014629 A1   10/2007
WO   WO2017035517 A1    3/2017

OTHER PUBLICATIONS

European Search Report for European Patent Application No. 19155505.1-1210 dated Jul. 16, 2019.
(Continued)

*Primary Examiner* — Vu Le
*Assistant Examiner* — Julius Chai
(74) *Attorney, Agent, or Firm* — Lempia Summerfield Katz LLC

(57) ABSTRACT

A method for segmenting metal objects in projection images acquired using different projection geometries is provided. Each projection image shows a region of interest. A three-dimensional x-ray image is reconstructed from the projection images in the region of interest. A trained artificial intelligence segmentation algorithm is used to calculate first binary metal masks for each projection image. A three-dimensional intermediate data set of a reconstruction region that is larger than the region of interest is reconstructed by determining, for each voxel of the intermediate data set, as a metal value, a number of first binary metal masks showing metal in a pixel associated with a ray crossing the voxel. A three-dimensional binary metal mask is determined. Second binary metal masks are determined for each projection image by forward projecting the three-dimensional binary metal mask using the respective projection geometries.

18 Claims, 3 Drawing Sheets

(52) U.S. Cl.
CPC ............ *G06T 2207/10081* (2013.01); *G06T 2207/20081* (2013.01); *G06T 2207/20084* (2013.01); *G06T 2207/30136* (2013.01)

(58) Field of Classification Search
CPC .......... G06T 2207/20084; G06T 2207/30136; G06K 9/4642; G16H 30/40
See application file for complete search history.

(56) References Cited

U.S. PATENT DOCUMENTS

| | | | |
|---|---|---|---|
| 2012/0308101 A1* | 12/2012 | Zeng | G06T 11/008 382/131 |
| 2015/0029178 A1* | 1/2015 | Claus | G06T 11/005 345/419 |
| 2019/0139272 A1* | 5/2019 | Pan | G06T 11/006 |
| 2020/0151921 A1* | 5/2020 | Schildkraut | G06K 9/6268 |
| 2021/0000438 A1* | 1/2021 | Wang | G06N 3/084 |
| 2021/0056688 A1* | 2/2021 | Xu | G06K 9/3241 |
| 2021/0065414 A1* | 3/2021 | Do | G06T 7/0014 |

OTHER PUBLICATIONS

Gjesteby, Lars, et al. "Metal artifact reduction in CT: where are we after four decades?." Ieee Access 4 (2016): 5826-5849.

Meyer, Esther, et al. "Normalized metal artifact reduction (NMAR) in computed tomography." Medical physics 37.10 (2010): 5482-5493.

Ronneberger, Olaf, Philipp Fischer, and Thomas Brox. "U-net: Convolutional networks for biomedical image segmentation." International Conference on Medical image computing and computer-assisted intervention. Springer, Cham, 2015. pp. 234-241.

Veldkamp, Wouter JH, et al. "Development and validation of segmentation and interpolation techniques in sinograms for metal artifact suppression in CT." Medical physics 37.2 (2010): 620-628.

* cited by examiner

SEGMENTING METAL OBJECTS IN PROJECTION IMAGES

This application claims the benefit of European Application No. EP19155505.1, filed Feb. 5, 2019, which is hereby incorporated by reference in its entirety.

BACKGROUND

The present embodiments are related to segmenting metal objects in projection images.

In x-ray imaging, it is known to reconstruct higher-dimensional images from lower-dimensional projection images acquired using an x-ray imaging device and different projection geometries. For example, filtered back-projection (FBP) or algebraic reconstruction may be used to reconstruct a three-dimensional x-ray image from two-dimensional projection images. The projection images may, for example, be acquired using a computed tomography device, where, usually, the x-ray source and, optionally, an x-ray detector are rotated inside a gantry. Alternatively, the projection images may be acquired using a c-arm device, where the x-ray source and the x-ray detector are mounted to the c-arm at opposite ends. During acquisition of the projection images, the projection geometry may be changed according to the acquisition trajectory, which is often circular, such that the projection geometry may be described by a projection angle.

In computed tomography and other applications, in which three-dimensional x-ray images are reconstructed from two-dimensional projection images, metal artifacts are a major problem. This is particularly true for interoperative acquisitions (e.g., x-ray images acquired during orthopaedic surgeries). Such metal artifacts are caused by metal objects/metal structures in the region of interest to be imaged, but also by metal objects outside the region of interest, which only appear in a part of the projection images having respective projection geometries in which x-rays traverse the metal object. To reduce these well-known metal artifacts, different approaches have been described. These approaches are often headlined metal artifact reduction (MAR) approaches and aim at improving the quality of the reconstructed volume (e.g., the x-ray image).

In most of these approaches (e.g., in flat-panel cone beam computed tomography), the location of the metal objects is estimated, the respective image values are removed from the projection images or the reconstructed three-dimensional x-ray image, and an interpolation process is performed (e.g., "inpainting"). The segmentation (e.g., the location of the metal object) is usually performed using an initial three-dimensional reconstruction, which thus still contains the metal artifacts. Voxels showing metal may, for example, be determined by thresholding and/or other volume processing algorithms. After the metal objects have been segmented, the three-dimensional segmentation is forward projected using the projection geometries to yield binary metal masks describing pixels that show the segmented metal objects. For these pixels, interpolations may be performed.

As an example, an algorithm called normalized metal artifact reduction (NMAR) is disclosed in an article by Esther Meyer et al, "Normalized metal artifact reduction (NMAR) in computed tomography," Medical Physics 37 (10), 2010, pages 5482-5493. Here, metal is also segmented in the image domain (e.g., the preliminary three-dimensional reconstruction using the original projection images). The segmentation is forward projected to identify the metal traces in the original projection. However, before interpolation, the projections are normalized based on a 3D forward projection of a prior image. After interpolation, the original raw data are denormalized again. This article also discusses some possible inpainting methods.

In another conceivable approach, it may be possible to segment metal objects already in the projection domain (e.g., the original two-dimensional projection images). For example, artificial intelligence segmentation algorithms may be used to segment metal and calculate binary metal masks containing the information whether a pixel contains metal or not. However, as internal studies of the applicant have shown, this approach does not yield robustness and reliability as expected.

Algorithms working on a preliminary reconstruction data set of the region of interest (e.g., the three-dimensional area that is captured in all two-dimensional projection images) has two major problems to deal with. For one, the metal object that causes the metal artifacts may be located outside the region of interest (e.g., the area that may be reliably reconstructed). Additionally, the metal objects produce artifacts in the preliminary reconstruction that may be poorly segmented using simple thresholds. While, for the second problem, approaches like automatic threshold determination and/or frequency split methods have been proposed, solutions regarding the first problem are not known yet.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a robust, reliable, and consistent segmentation of metal objects shown in projection images, which allows localization of metal objects outside the region of interest to be reconstructed in the three-dimensional image, is provided.

A method according to the present embodiments includes using a trained artificial intelligence segmentation algorithm to calculate first binary metal masks for each projection image. A three-dimensional intermediate data set of a reconstruction region that is larger than the region of interest is reconstructed by determining, for each voxel of the intermediate data set, as a metal value, the number of first binary metal masks showing metal in a pixel associated with a ray crossing the voxel. A three-dimensional binary metal mask, in which a voxel shows metal when the metal value is larger than a threshold value and no metal in all other cases, is determined. Second binary metal masks are determined for each projection image by forward projecting the three-dimensional binary metal mask using the respective projection geometries.

One or more of the present embodiments thus use an artificial intelligence segmentation algorithm in the projection domain, which is also able to locate metal objects only captured by some of the two-dimensional projection images, and add another mechanism increasing robustness and consistency of the segmentation of the metal compared to artificial intelligence segmentation alone or the current threshold-based segmentation in the image domain. The segmentation of the present embodiments is also obtained outside of the region of interest (ROI). By back-projecting the x-ray projection-based segmentation (e.g., the first binary metal masks, thresholding, and maximum projection of the threshold values), consistent second binary metal masks using all projection images are calculated. Thus, a more robust metal artifact reduction may be provided reducing the number of artifacts.

For example, the second binary metal masks may be used for metal artifact reduction in the tree-dimensional x-ray image (e.g., using an inpainting algorithm for pixels showing a metal object according to the second binary metal masks). As the consistent second binary metal masks include the information that pixels of a projection image show metal, areas in the projection images showing metal objects or metal structures may be identified, and interpolation approaches as known in the state of the art may be applied.

In a preparatory step, the two-dimensional x-ray projection images are acquired using an x-ray imaging device (e.g., a computed tomography device or a c-arm x-ray imaging device). For example, a circular acquisition trajectory may be used. Generally, each two-dimensional projection image is associated with a projection geometry (e.g., in the case of a circular acquisition trajectory, a projection angle). The projection images may be acquired in a cone-beam geometry.

Due to their nature as projection images, it is possible that metal objects localized outside the region of interest to be imaged may be visible in a fraction of the projection images. By using the combination of an artificial intelligence approach in the projection domain and a consistency check in the three-dimensional image domain, extended to a larger reconstruction region than the region of interest, these metal objects lying outside the region of interest may also be reliably detected.

In a first act, a trained artificial intelligence segmentation algorithm is used to calculate first binary metal masks for each projection image. For example, a convolutional neural network may be used (e.g., a U-net). Suitable convolutional neural networks are, for example, described in an article by Olaf Ronneberger et al., "U-Net: Convolutional Networks for Biomedical Image Segmentation", arXiv: 1505.04597v1 [cs.CV], May 18, 2015.

As training data, projection images in which the metal objects are already annotated may be used. It is possible to enlarge the size of the training data set by generating synthetic data and/or to split the training data into a training data set and a validation data set. The trained artificial intelligence segmentation algorithm is then applied to the two-dimensional projection images. The artificial intelligence segmentation algorithm uses one of the projection images as input data and yields a first binary metal mask for this projection image as output data. For example, for a given pixel, a binary metal mask may contain "1" if the pixel shows metal, and "0" if the pixel shows no metal. Generally, for each pixel, a binary metal mask contains the binary information if a pixel shows metal or not.

The first binary metal masks, which are to be checked for consistency and improved to yield second binary metal masks, are then back-projected into a volume that is larger than the region of interest (e.g., the reconstruction region). This reconstruction is performed by counting, for each voxel of the resulting intermediate data set, how many pixels associated with a ray crossing the voxel (e.g., according to the respective, known projection geometry) and measured in a projection image are described as showing metal by the first binary metal mask.

In a third act, for each voxel, this metal value may be compared with a threshold. If the metal value is larger than the threshold value, many or most of the relevant projection images consistently show that metal should be present at this position. However, lower metal values, in which voxels obtain contributions that are no metal, but lie on rays that also intersect metal objects, may be discarded, as well as singular segmentation errors in the projection domain.

In a last act, the so-determined three-dimensional binary metal mask (e.g., assigning a value of "1" for voxels being part of a metal object and "0" for voxels not part of a metal object) is then forward-projected in each of the projection geometries to yield second binary metal masks for each projection image. The forward projection uses a maximum operator and is thus a maximum projection to yield masks also only containing "1" and "0".

In one embodiment, for each voxel of the intermediate data-set, a contribution value describing the number of first binary metal masks having a pixel associated with a ray crossing the voxel may be additionally determined. The threshold value for each voxel is chosen depending on the contribution value. In other words, the back-projecting regarding the first binary metal masks does not only count how many first binary metal masks show metal for voxel, but also, according to the projection geometries, how many first binary metal masks are associated with rays traversing the voxel and being measured in a pixel. Rays in this sense may be understood as emanating from the focal point and ending on the pixel position of the detector in the respective projection geometry (e.g., in the middle of an actual detector pixel). As the reconstruction region is larger than the region of interest, voxels in the outer areas of the reconstruction region are not captured by all projection images. It is thus advantageous to know how many projection geometries are able to contribute to a certain voxel of the intermediate dataset, such that the threshold value may be correspondingly chosen. In other words, the quotient of the metal value and the contribution value may be understood as a probability for having a metal object at the respective voxel.

For example, the threshold value may be computed from the respective contribution value (e.g., by using a threshold factor). In one embodiment, the threshold value is determined by multiplying a threshold factor larger than 0.8 and smaller than 1 with the contribution value. For example, the threshold factor may be chosen as 0.95. In this case, the threshold is a relative threshold. In other words, to distinguish between voxels belonging to a metal object and not belonging to a metal object in this embodiment, it is checked if a certain percentage (e.g., the threshold factor) of the projection geometries contributing to the voxel had first binary metal masks showing metal at the corresponding pixel.

Alternatively, an absolute threshold offset (e.g., an integer to be subtracted from the contribution value to obtain the threshold value) may be used. The threshold offset, as well as the threshold factor, may depend on the minimum of the contribution value allowed by the choice of the reconstruction region.

Regarding the choice of the reconstruction region, in an embodiment, the reconstruction region may be chosen such that a defined minimum of the contribution value over all voxels is complied with. In other words, only voxels that are imaged in at least a certain number of projection geometries (e.g., the minimum number) are reviewed. In this manner, contribution values that are too low to provide meaningful information may be avoided.

The present embodiments also include an evaluation device including a computing device configured to perform a method according to the present embodiments. The computing device includes a segmentation unit using the trained artificial intelligence segmentation algorithm to calculate the first binary metal masks for each projection image, and a reconstruction unit for determining the three-dimensional intermediate data set. The computing device also includes a comparison unit for determining the three-dimensional binary metal mask, and a determination unit for determining the second binary metal masks.

All remarks and advantages laid out above regarding the method also apply to the evaluation device. For example, the computing device of the evaluation device may include at least one processor (e.g., at least one image processor) and at least one storage device. The at least one processor realizes the functional units laid out above (e.g., the segmentation unit, the reconstruction unit, the comparison unit, and the determination unit). Additional units may be added regarding additional acts or sub-acts according to the described embodiments of the method, which may also be transferred to advantageous embodiments of the evaluation device. The processor may, for example, be or include an integrated circuit, a CPU, a GPU, or the like.

In an embodiment, the evaluation device is or is part of an x-ray imaging device, and/or the computing device is a control device of the x-ray imaging device. In this manner, an x-ray imaging device, which is also used to acquire the two-dimensional projection images, may already be configured to evaluate the two-dimensional projection images regarding artifacts caused by metal objects. In this context, it is also advantageous if the x-ray imaging device (e.g., a control device of the x-ray imaging device) is also configured to perform the metal artifact correction (e.g., by using an MAR unit).

The x-ray imaging device may, for example, be a computed tomography device or may be a c-arm x-ray imaging device having a c-arm with opposing ends to which an x-ray source and an x-ray detector (e.g., a flat-panel detector) are mounted. X-ray imaging devices having a c-arm may be used to provide interoperative imaging (e.g., for surveying the surgery performed on a patient). Metal objects may, for example, in this context, include medical instruments and/or medical implants.

A computer program according to the present embodiments may, for example, be directly loaded into a storage device of a computing device (e.g., a control device of an x-ray imaging device) and includes program to perform the acts of a method according to the present embodiments if the computer program is executed in the computing device. The computer program may be stored on an electronically readably storage medium (e.g., a non-transitory computer-readable storage medium) that thus includes electronically readable control information (e.g., instructions) stored thereon. The control information includes at least a computer program according to the present embodiments and is configured such that the control information executes a method according to the present embodiments when the storage medium is used in a computing device (e.g., a control device of an x-ray imaging device). The electronically readably storage medium according to the present embodiments may be a non-transient medium (e.g., a CD-ROM).

DETAILED DESCRIPTION

Figure 1:
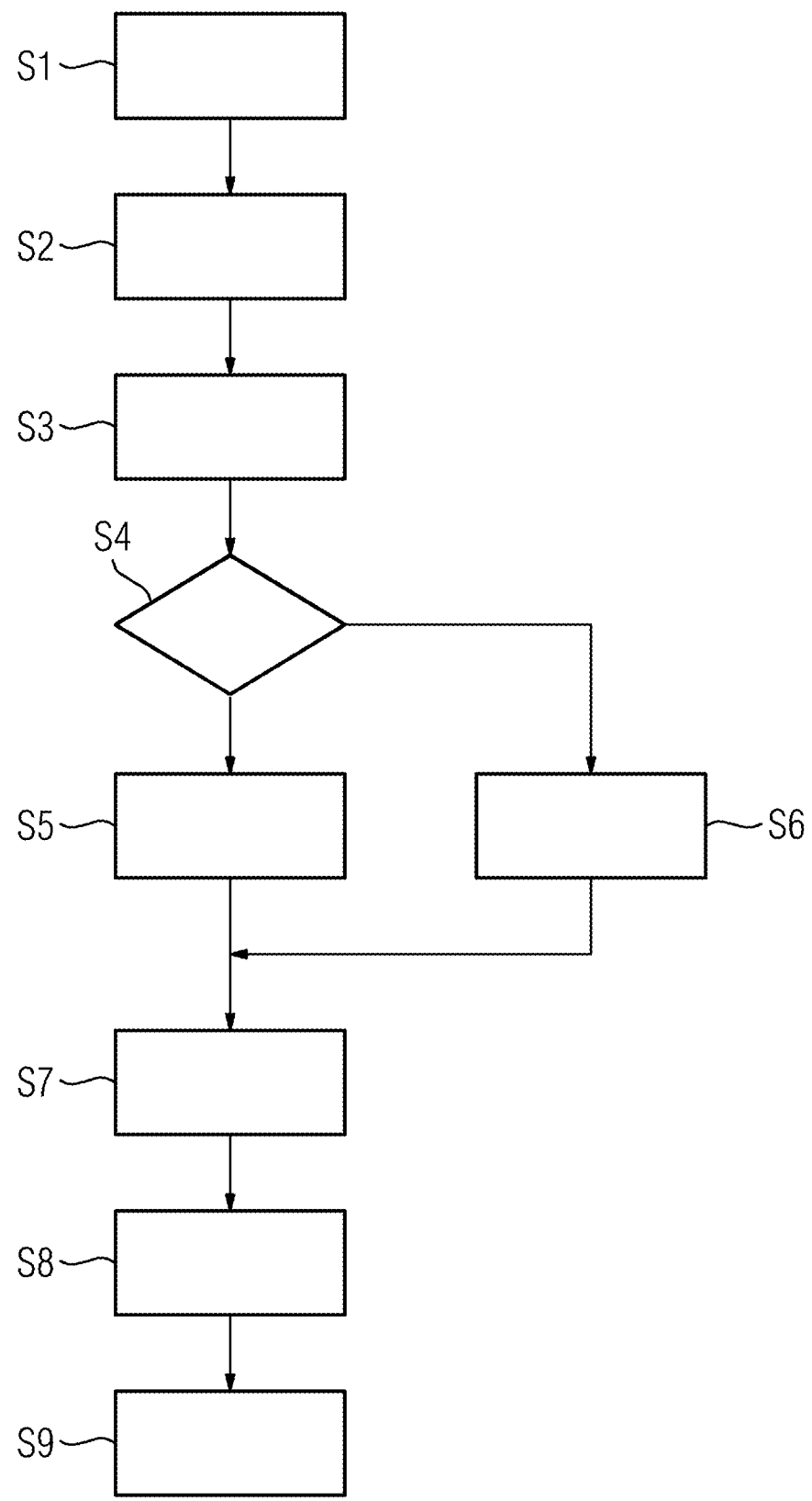
FIG. 1 shows a flowchart of an embodiment of a method.

FIG. 1 shows an exemplary flowchart of an embodiment of a method.

In act S1, two-dimensional (2D) projection images of a region of interest of a patient are acquired using an x-ray imaging device and multiple different projection geometries. For example, the 2D projection images may be acquired in the scope of an intervention to be performed on the patient (e.g., an orthopaedic surgery). Metal objects may thus be present in the region of interest and/or outside the region of interest in a cone-beam of at least some of the projection geometries. Such metal objects may, for example, include metal objects (e.g., medical instruments and/or implants).

As a three-dimensional x-ray image of the region of interest is to be reconstructed from the projection images, such metal objects may cause artifacts during the reconstruction process, such that the method provided performs a metal artifact reduction (MAR) process to reduce these artifacts and improve the quality of the resulting x-ray image. The present embodiments, in this context, concern the segmentation of metal objects (e.g., the detection in the projection domain, the projection images), such that in a later act, corrective measures may be applied (e.g., the application of an inpainting algorithm).

To segment and thus localize the metal objects in the two-dimensional projection images acquired in act S1, in an act S2, a trained artificial intelligence segmentation algorithm (e.g., a convolutional neural network, such as a U-net) is applied to each of the two-dimensional projection images, yielding first binary metal masks for each two-dimensional projection image. In other words, a two-dimensional projection image is used as input data, where the output data is the first binary metal mask $m(u, v)$; $m(u, v)$ equals "1" if the pixel $(u, v)$ shows metal according to the algorithm, and $m(u, v)$ equals "0" if the pixel $(u, v)$ shows no metal. As training data, annotated projection images may be used.

As it has been observed that artificial intelligence algorithms may not yield optimal (e.g., consistent) results and wrong segmentations may occur, the segmentation results in the projection domain are checked in the following acts, yielding consistent second binary metal masks for each projection image and a more robust segmentation.

In act S3, a three-dimensional (3D) intermediate data set of a reconstruction region is reconstructed. The reconstruction region is larger than the region of interest, as further explained by FIG. 2.

Figure 2:
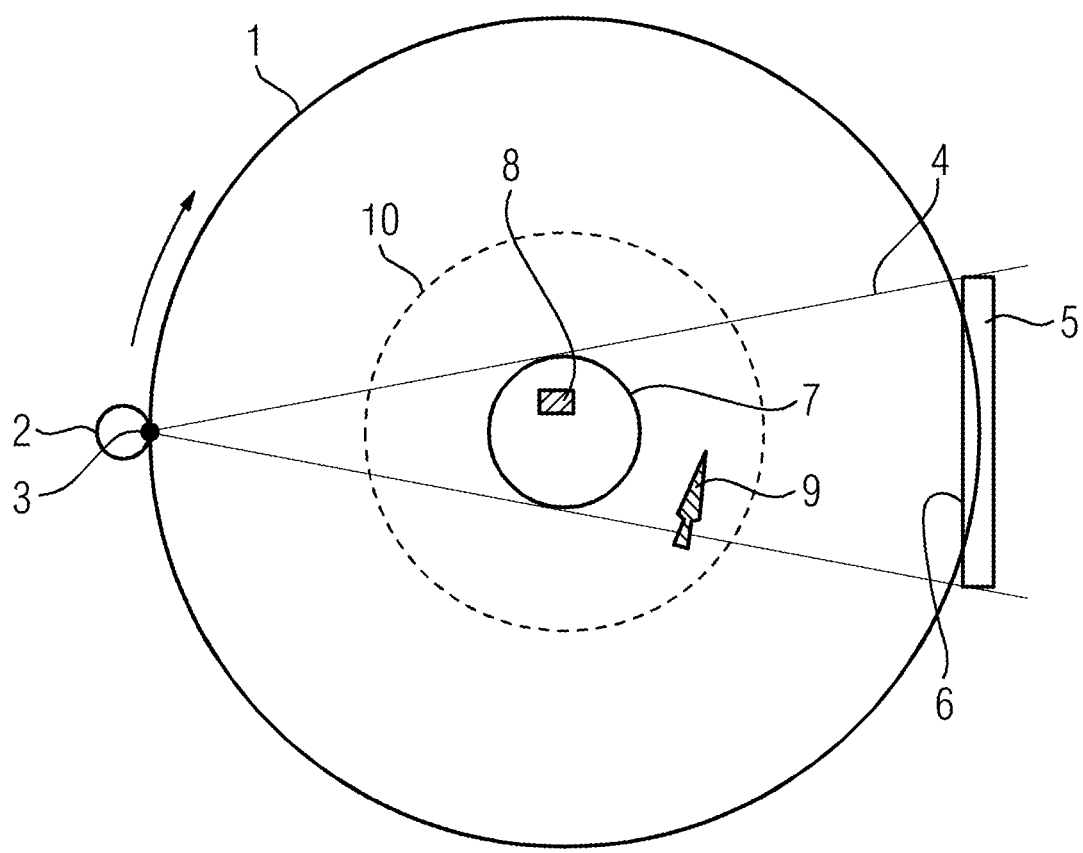
FIG. 2 shows an exemplary projection geometry and regions used for reconstruction.

FIG. 2 shows a schematic drawing regarding the projection geometries and regions used for reconstruction. In this case, a circular acquisition trajectory 1 is used, which is traversed by the x-ray source 2 having a focal spot 3 to realize different projection geometries. One projection geometry is indicated by the cone beam 4 in the shown position of the focal spot 3. The x-ray detector 5 and a detection surface 6 of the x-ray detector 5 are also indicated.

In this manner, an at least essentially cylinder-shaped region of interest 7 is imaged in each of the projection geometries possible along the acquisition trajectory 1. If, thus, a metal object 8 is located inside the region of interest 7, each projection image will show the metal object 8. However, additionally, metal objects 9 located outside the region of interest 7 may also be imaged by some of the projection images, while other projection images will not contain the metal objects 9. However, also, such metal objects 9 outside the region of interest 7 may induce metal artifacts into a reconstructed three-dimensional x-ray image.

Thus, in act S3 in FIG. 1, a reconstruction region 10 is defined such that all possible objects in the reconstruction region 10, which is larger than the region of interest 7, are imaged in at least a minimum number of the projection geometries used. For example, if fifty projection geometries are used and thus fifty two-dimensional projection images are acquired in act S1, the reconstruction region 10 may be chosen such that even objects (e.g., metal objects) positioned at the radially outer border of the reconstruction region 10 are imaged in at least twenty of the projection geometries.

Using the so-defined reconstruction region 10, the intermediate data set is reconstructed. In the intermediate data set, each voxel contains two values (e.g., a contribution value and a metal value). The contribution value describes the number of projection geometries in which the voxel is traversed by a ray inside the cone beam 4 corresponding to a pixel, thus imaged. The metal value corresponds to the number of first binary metal masks showing metal for a pixel corresponding to the ray of the respective projection geometry traversing the voxel. To determine these values, since the projection geometries are known, for each projection geometry, it is checked if a ray inside the cone beam 4 that traverses the voxel exists and to which pixel of the projection geometry the ray corresponds. If such a ray exists, the contribution value is increased by one. The ray is then referred to the pixel associated with the ray in the respective first binary metal mask. If this pixel is assigned as showing metal, the metal value is increased by one; otherwise, the metal value is not increased.

The ratio of the metal value to the contribution value may be a probability that metal is actually present in the voxel.

In act S4, a threshold value is chosen, and it is checked whether the metal value is larger than the threshold value. The threshold value is determined depending on the contribution value, where in the embodiment described, a relative threshold value is defined using a threshold factor larger than 0.8 and smaller than 1 (e.g., 0.95), such that the threshold value may be calculated as the threshold factor multiplied with the contribution value. If, for the currently examined voxel of the intermediate data set, the metal value actually exceeds the threshold value, in act S5, the voxel is marked as containing metal (e.g., in assigning a value of "1"). In any other case, in act S6, the voxel is assigned a value of "0" (containing no metal).

The acts S4 and S5/S6 are repeated for each voxel in the reconstruction region 10, such that a three-dimensional binary metal mask results. The comparison with the threshold value thus allows a classification of the voxel as metal or no metal.

In act S7, the mask volume (e.g., the three-dimensional binary metal mask) is forward-projected for each projection geometry using the maximum operator to yield second binary metal masks for each projection image.

Using these second binary metal masks, in act S8, the pixel values of the pixels marked as showing metal in the second binary metal mask may be replaced in each projection image (e.g., by interpolation). In other words, generally, in act S8, an inpainting algorithm may be used for metal artifact reduction (MAR) based on the segmentation described by the second binary metal masks.

Finally, in act S9, the x-ray image may be reconstructed from the so-corrected projection images and, for example, displayed, stored or otherwise processed.

Figure 3:
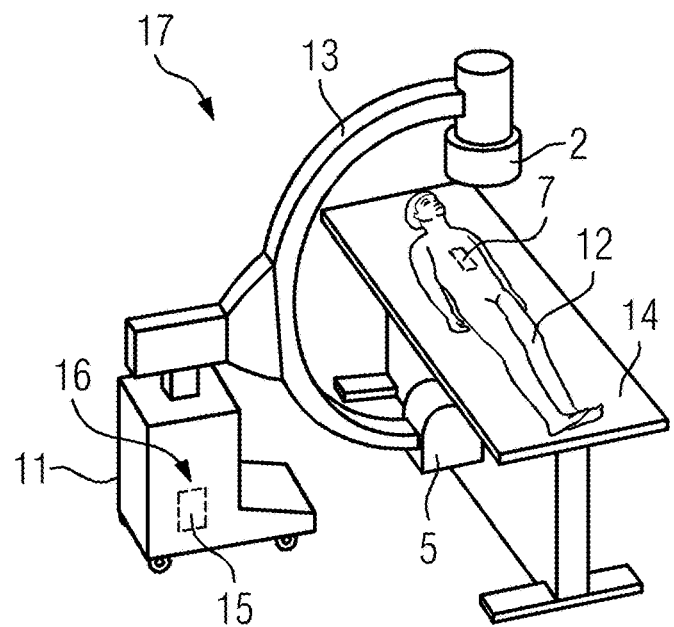
FIG. 3 is a schematic drawing of one embodiment of an x-ray imaging device.

FIG. 3 shows a mobile x-ray imaging device 11 that is especially suitable for the supervision/monitoring of a medical intervention on the patient 12, since the c-arm 13, to which in opposing positions the x-ray source 2 and the x-ray detector 5 are mounted, allows for multiple projection geometries with respect to the patient 12, who is placed on a patient table 14. For example, the mobile x-ray imaging device 11 may be removed during surgical processes, or at least the c-arm 13 may be moved into a position where the c-arm 13 does not impede the surgical process.

The c-arm 13 may also be rotated around the region of interest 7 to acquire projection images in different projection geometries (e.g., projection angles).

Since the control device 15 of the x-ray imaging device 11 in this case also forms a computing device 16 configured to perform the method according to the present embodiments, the x-ray imaging device 11 also forms an evaluation device 17 according to the present embodiments.

Figure 4:
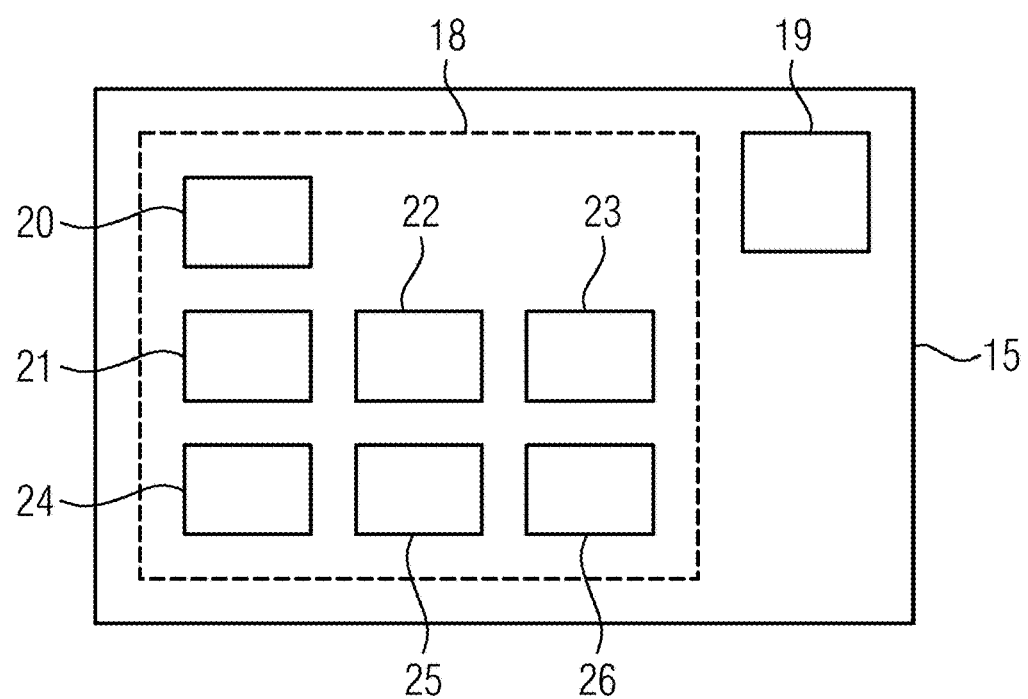
FIG. 4 shows exemplary functional structure of the control device of the x-ray imaging device of FIG. 2.

FIG. 4 illustrates the functional structure of the control device 15. Generally, the control device 15 may include at least one processor 18, where, for example, in this case, a controller and an image processor may be used as processors. The control device 15 further includes at least one storage device 19.

By the processor 18, multiple functional units are realized. In this case, the control device 15 includes, as in principle known, an acquisition control unit 20 (e.g., an acquisition controller) that may, for example, control the acquisition of the two-dimensional projection images S1. The control device 15 also includes a segmentation unit 21 for performing the act S2, a reconstruction unit 22 for performing the act S3, a comparison unit 23 for performing the acts S4 to S6, and a determination unit 24 for performing the act S7 (e.g., formed by one or more processors). An MAR unit 25 for performing the act S8 and a back-projection unit 26 for reconstructing the three-dimensional x-ray images in act S9 may be provided (e.g., formed by the one or more processors or one or more other processors).

Although the present invention has been described in detail with reference to exemplary embodiments, the present invention is not limited by the disclosed examples from which the skilled person is able to derive other variations without departing from the scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for segmenting metal objects in multiple two-dimensional (2D) projection images acquired using different projection geometries, each projection image of the multiple 2D projection images showing a region of interest, wherein a three-dimensional (3D) x-ray image is reconstructed from the 2D projection images in the region of interest, the method comprising:
calculating first binary metal masks for each 2D projection image of the multiple 2D projection images using a trained artificial intelligence segmentation algorithm;
reconstructing a 3D intermediate data set of a reconstruction region that is larger than the region of interest, wherein the reconstruction region includes locations outside of the region of interest, and wherein the reconstructing comprises determining, for each voxel of the 3D intermediate data set and including voxels in the reconstruction region outside of the region of interest and present in less than all of the multiple 2D projection images, as a metal value, a number of first binary metal masks showing metal in a pixel associated with a ray crossing the respective voxel;

determining a 3D binary metal mask, in which a voxel shows metal when the metal value is larger than a threshold value and no metal in all other cases; and determining second binary metal masks for each 2D projection image of the multiple 2D projection images, the determining of the second binary metal masks comprising forward projecting the 3D binary metal mask using the respective projection geometries.

2. The method of claim 1, wherein the second binary metal masks are used for metal artifact reduction in the 3D x-ray image.

3. The method of claim 2, wherein the second binary metal masks are used for metal artifact reduction in the 3D x-ray image using an inpainting algorithm for pixels showing a metal object according to the second binary metal mask.

4. The method of claim 1, wherein, for each voxel of the 3D intermediate data set, a contribution value describing the number of first binary metal masks having a pixel associated with a ray crossing the voxel is additionally determined, and
wherein the threshold value for each voxel is chosen depending on the contribution value.

5. The method of claim 4, further comprising determining the threshold value, the determining of the threshold value comprising multiplying a threshold factor larger than 0.8 and smaller than one with the contribution value.

6. The method of claim 4, wherein the reconstruction region is chosen such that a defined minimum of the contribution value over all voxels is complied with.

7. The method of claim 1, wherein a convolutional neural network is used as the artificial intelligence segmentation algorithm.

8. The method of claim 7, wherein the convolutional neural network is a u-net.

9. An evaluation device comprising:
a computing device configured to segment metal objects in multiple two-dimensional (2D) projection images acquired using different projection geometries, each projection image of the multiple 2D projection images showing a region of interest, wherein a three-dimensional (3D) x-ray image is reconstructed from the 2D projection images in the region of interest, the segmentation comprising:
calculation of first binary metal masks for each 2D projection image of the multiple 2D projection images using a trained artificial intelligence segmentation algorithm;
reconstruction of a 3D intermediate data set of a reconstruction region that is larger than the region of interest, wherein the reconstruction region includes locations outside of the region of interest, and wherein the reconstructing comprises determining, for each voxel of the 3D intermediate data set and including voxels in the reconstruction region outside of the region of interest and present in less than all of the multiple 2D projection images, as a metal value, a number of first binary metal masks showing metal in a pixel associated with a ray crossing the respective voxel;

determination of a 3D binary metal mask, in which a voxel shows metal when the metal value is larger than a threshold value and no metal in all other cases; and determination of second binary metal masks for each 2D projection image of the multiple 2D projection images, the determination of the second binary metal masks comprising forward projection of the 3D binary metal mask using the respective projection geometries, wherein the computing device comprises:
a segmentation unit configured to use the trained artificial intelligence segmentation algorithm to calculate the first binary metal masks for each 2D projection image of the multiple 2D projection images;
a reconstruction unit configured to determine the 3D intermediate data set;
a comparison unit configured to determine the 3D binary metal mask; and
a determination unit configured to determine the second binary metal masks.

10. The evaluation device of claim 9, wherein the evaluation device is or is part of an x-ray imaging device, the computing device is a control device of the x-ray imaging device, or a combination thereof.

11. A non-transitory computer-readable storage medium that stores instructions executable by one or more processors to segment metal objects in multiple two-dimensional (2D) projection images acquired using different projection geometries, each projection image of the multiple 2D projection images showing a region of interest, wherein a three-dimensional (3D) x-ray image is reconstructed from the 2D projection images in the region of interest, the instructions comprising:
calculating first binary metal masks for each 2D projection image of the multiple 2D projection images using a trained artificial intelligence segmentation algorithm;
reconstructing a 3D intermediate data set of a reconstruction region that is larger than the region of interest, wherein the reconstruction region includes locations outside of the region of interest, and wherein the reconstructing comprises determining, for each voxel of the 3D intermediate data set and including voxels in the reconstruction region outside of the region of interest and present in less than all of the multiple 2D projection images, as a metal value, a number of first binary metal masks showing metal in a pixel associated with a ray crossing the respective voxel;
determining a 3D binary metal mask, in which a voxel shows metal when the metal value is larger than a threshold value and no metal in all other cases; and
determining second binary metal masks for each 2D projection image of the multiple 2D projection images, the determining of the second binary metal masks comprising forward projecting the 3D binary metal mask using the respective projection geometries.

12. The non-transitory computer-readable storage medium of claim 11, wherein the second binary metal masks are used for metal artifact reduction in the 3D x-ray image.

13. The non-transitory computer-readable storage medium of claim 12, wherein the second binary metal masks are used for metal artifact reduction in the 3D x-ray image using an inpainting algorithm for pixels showing a metal object according to the second binary metal mask.

14. The non-transitory computer-readable storage medium of claim 11, wherein, for each voxel of the 3D intermediate data set, a contribution value describing the number of first binary metal masks having a pixel associated with a ray crossing the voxel is additionally determined, and wherein the threshold value for each voxel is chosen depending on the contribution value.

15. The non-transitory computer-readable storage medium of claim 14, wherein the instructions further comprise determining the threshold value, the determining of the threshold value comprising multiplying a threshold factor larger than 0.8 and smaller than one with the contribution value.

16. The non-transitory computer-readable storage medium of claim 14, wherein the reconstruction region is chosen such that a defined minimum of the contribution value over all voxels is complied with.

17. The non-transitory computer-readable storage medium of claim 11, wherein a convolutional neural network is used as the artificial intelligence segmentation algorithm.

18. The non-transitory computer-readable storage medium of claim 17, wherein the convolutional neural network is a u-net.

* * * * *